United States Patent

Dammann et al.

[15] 3,660,768

[45] May 2, 1972

[54] PRECISION RECTIFIER WITH IMPROVED TRANSIENT RESPONSE

[72] Inventors: Carl Leslie Dammann, Holmdel; Frederick Alan Saal, Colts Neck, both of N.J.

[73] Assignee: Bell Telephone Laboratories, Incorporated, Murray Hill, N.J.

[22] Filed: Dec. 21, 1970

[21] Appl. No.: 100,175

[52] U.S. Cl. ................................328/26, 307/229, 307/237, 307/296, 307/261, 328/142

[51] Int. Cl. ..........................................................G06g 7/14

[58] Field of Search ..................328/26; 307/229, 230; 321/8

[56] References Cited

UNITED STATES PATENTS 3,553,566 1/1971 Naay, Jr. ..............................328/26 X

*Primary Examiner*—Donald D. Forrer
*Assistant Examiner*—B. P. Davis
*Attorney*—R. J. Guenther and E. W. Adams, Jr.

[57] ABSTRACT

A precision rectifier circuit rectifies voltage signals near zero without a loss in transient response. This is accomplished by reducing the gain of the amplifier with an additional feedback resistor. The error in the output current caused by this resistor is canceled by supplying additional current from the amplifier to the rectifier output through a second rectifier and a resistor.

7 Claims, 15 Drawing Figures

INVENTORS C. L. DAMMANN
F. A. SAAL
BY David P. Kelley
ATTORNEY

PRECISION RECTIFIER WITH IMPROVED TRANSIENT RESPONSE

BACKGROUND OF THE INVENTION

This invention relates to rectifier circuits and, more particularly, to precision active rectifiers with dual diode-resistor feedback paths. Precision rectifiers, as opposed to power rectifiers, produce an accurate rectified version of the input signal and are used in signal processing systems. They are particularly useful in the coder stages of PCM systems. A typical prior art rectifier circuit is disclosed in the *Handbook of Operational Amplifiers Applications*, by the Applications Engineering Section of Burr-Brown Research Corporation (1963), on page 73. That rectifier circuit produces an accurate rectified version of the input voltage except when the input is rapidly switched to zero. When this happens, the diode-resistor feedback paths open, causing the gain of the operational amplifier to increase. This increase in gain causes a corresponding reduction in the amplifier's bandwidth. This reduction in bandwidth causes poor transient response and, therefore, reduces the accuracy of rectification. Prior art methods of overcoming this problem involve forward biasing the feedback diodes to limit their maximum feedback resistance. This keeps the gain of the amplifier from increasing to a point where the time constant is adversely affected. However, this produces a rounding of the rectifier characteristic and corresponding inaccuracies in the rectification.

It is therefore an object of this invention to maintain accuracy and bandwidth over the entire input voltage range in a precision rectifier circuit, including those input signals near zero.

SUMMARY OF THE INVENTION

The present invention is directed to reducing the problem of loss of bandwidth in precision rectifiers, which use operational amplifiers with diode-resistance feedback paths, for input signals near zero. This is accomplished by restricting the gain of the operational amplifiers. This eliminates the need for forward biasing the diodes in the feedback path which produces inaccuracies in the rectification. In an illustrative embodiment of the invention a half wave rectifier is used. This half wave rectifier comprises an operational amplifier with first and second diode-resistor feedback paths. The first feedback path has the anode of a first diode connected to the output of the operational amplifier and its cathode connected through a first resistance to the input of the operational amplifier. The second feedback path has the cathode of a second diode connected to the output of the operational amplifier and its anode connected through a second resistance to the input of the operational amplifier. A third resistance is provided from the input of the operational amplifier to the input of the circuit. A fourth resistance is connected from the cathode of the first diode to the output of the circuit. This arrangement is basically similar to prior art half wave rectifiers. A fifth resistance connected from the input of the circuit to the output of the circuit makes this arrangement a full wave rectifier. This arrangement suffers from the transient response problems previously mentioned. A sixth resistor connected from the input of the operational amplifier to its output restricts the gain of the operational amplifier during the time when the diode-resistor feedback paths are open. However, this additional resistor produces an error in the output current for input voltages less than zero. This error is canceled by current from the output of the operational amplifier directed to the circuit output through a switch and a seventh resistor. The seventh resistor is made equal to one-half the value of the sixth resistor and the switch is closed only when the input voltage is less than zero. The switch and seventh resistor combination is implemented by connecting a unity gain half wave rectifier and an eighth resistor in series between the output of the operational amplifier and the circuit output. Also, a ninth resistor is connected from the output of the operational amplifier to the output of the circuit. The eighth and the ninth resistors are equal and have a value equal to one-half the value of the sixth resistor. This arrangement allows for accurate rectification without loss of bandwidth over the entire input voltage range.

The foregoing and other features of the present invention will be more readily apparent from the following detailed description and drawings.

DETAILED DESCRIPTION

Figure 1:
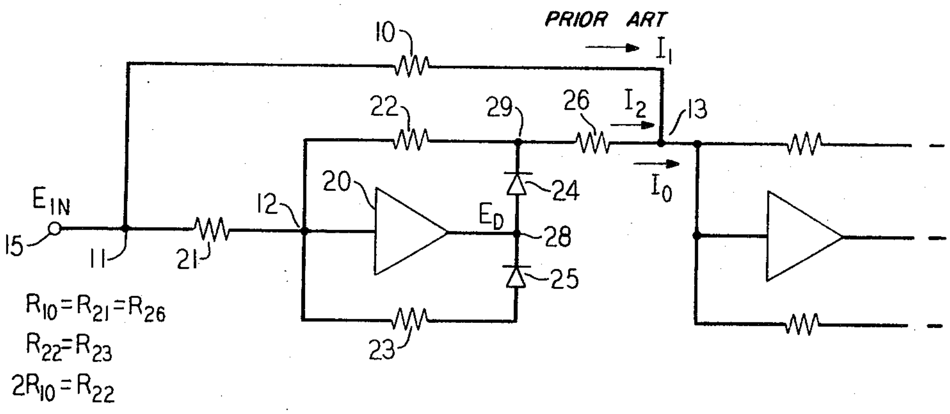
FIG. 1 PRIOR ART
FIG. 1 is a schematic of a prior art rectifier.

FIG. 1 is a schematic diagram of a prior art rectifier. The circuit input terminal 15 is connected to terminal 11 and resistance 21 ($R_{21}$) is connected between terminal 11 and terminal 12. The input of an operational amplifier 20 is also connected to terminal 12. The output of operational amplifier 20 is connected to a terminal 28. The anode of a diode 24 and the cathode of a diode 25 are also connected to terminal 28. The cathode of diode 24 is connected to a terminal 29. A resistance 22 ($R_{22}$) is connected between terminals 12 and 29. The anode of diode 25 is connected through a resistance 23 ($R_{23}$) to terminal 12. A resistance 26 ($R_{26}$) is connected between terminal 29 and circuit output terminal 13. A resistance 10 ($R_{10}$) is connected between the terminal 11 and the circuit output terminal 13. In this circuit resistances 10, 21 and 26 are equal, resistance 22 is equal to 23, and resistance 10 is one-half resistance 22. The rectifier as shown in FIG. 1 is used as a coder stage in a PCM system. Therefore, output terminal 13 is connected to the summing junction of the operational amplifier of the next stage.

Figure 2A:
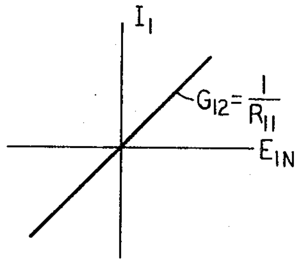
FIGS. 2A, 2B, 2C and 2D show the operation of the prior art rectifier of FIG. 1.
Figure 2B:
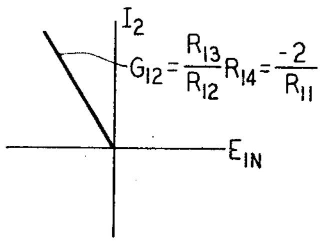

The current $I_1$, which passes through resistance 10, is shown in FIG. 2A. The current $I_2$, which passes through resistance 26, is shown in FIG. 2B. When the input voltage is positive, the voltage $E_D$ at terminal 28 is negative and diode 24 will not conduct. Therefore, the current $I_2$ is zero whenever the input voltage is positive. When the input voltage is negative, the voltage at terminal 29 is positive and follows the input voltage with a gain of minus two, as shown in FIG. 2B. These two currents, $I_1$ and $I_2$, combine to produce the output current shown in FIG. 2C. The curve of FIG. 2D shows what happens at the output of the operational amplifier in the region where the input voltage is nearly zero. As shown in FIG. 2D, the gain of the operational amplifier is very high when neither diode 24 nor diode 25 is conducting. After they begin to conduct the output of the operational amplifier follows the input voltage with a gain of minus two.

Figure 3A:
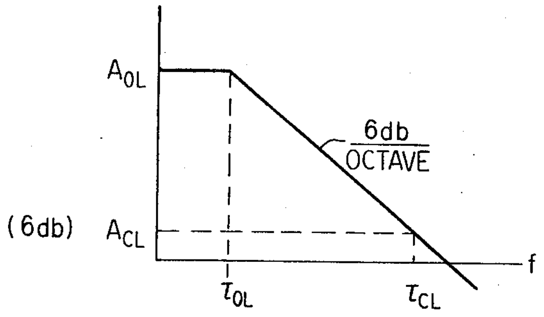
FIGS. 3A and 3B are a set of curves showing the loss of frequency response with the prior art rectifier of FIG. 1.
Figure 3B:
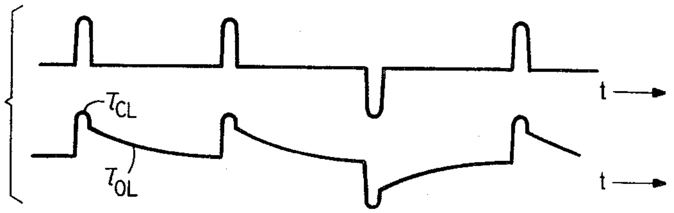

FIG. 3A shows the effect of this change in gain on the bandwidth of the operational amplifier. When the diodes are conducting, the circuit operates with a closed loop gain, $A_{cl}$, of 6 db. This allows the operational amplifier to have a time constant $T_{cl}$. As the feedback loops open, the gain approaches its open loop value, $A_{ol}$, and the time constant of the amplifier approaches its open loop value, $T_{ol}$. The effect on this on the rectification can be seen from FIG. 3B. As the output voltage of the amplifier approaches zero the time constant changes from $T_{cl}$ to $T_{ol}$. This causes a trailing edge which represents an inaccuracy in the rectification. This inaccuracy causes problems when the circuit is used as a coder stage in PCM systems.

Figure 4A:
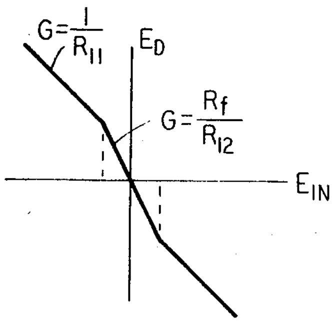
FIGS. 4A, 4B and 4C are a set of curves showing the effect of providing an additional feedback resistor in a prior art rectifier.
Figure 4B:
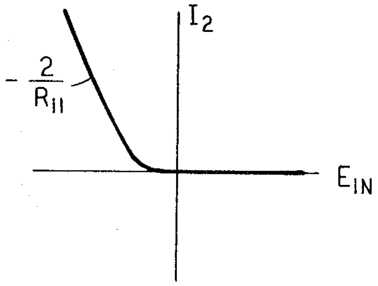
Figure 4C:
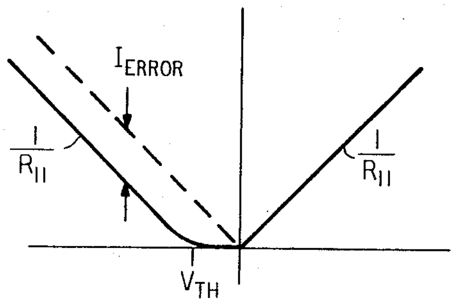
Figure 5:
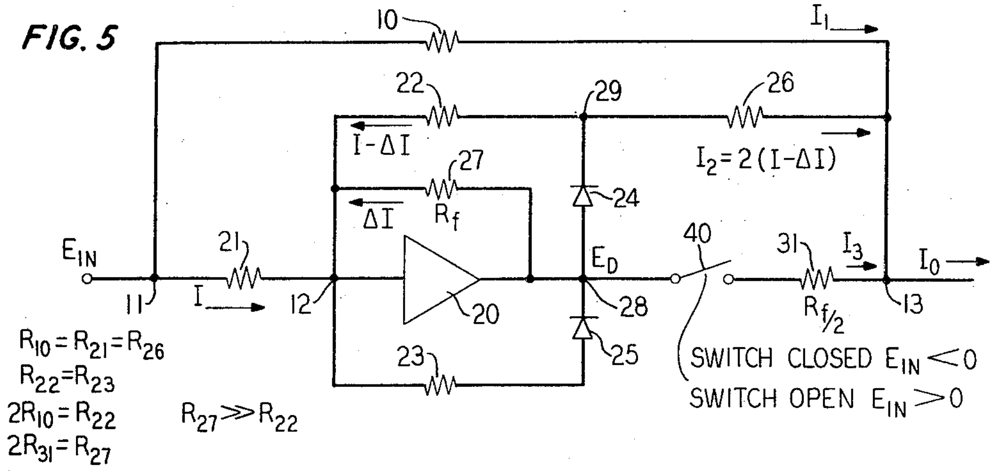
FIG. 5 is an illustrative embodiment of the invention.

In overcoming this loss of bandwidth by practicing the present invention a feedback resistor $R_{27}$ of FIG. 5 is connected from the input of the operational amplifier to its output. This causes the gain of the operational amplifier, when the diode-resistor feedback paths are open, to be held to a lower value than that shown in FIG. 3A. The effect of adding this resistor is shown by comparing FIG. 4A to FIG. 2D. The gain in the region where the input signal is near zero has been significantly reduced. This causes the current $I_2$ to appear, as shown in FIG. 4B. The rounding of the curve is caused by the diode characteristic. The translation to the left is caused by the reduced gain in the region near zero and the current diverted from the output through the feedback resistance. When the currents $I_1$ and $I_2$ are summed, at the output, the curve of FIG. 4C is produced. As can be seen from this curve, there is a significant error in the output current of the rectifier. This could be partially corrected by biasing the circuit to the point $V_{th}$. However, this point is dependent on the diode characteristic and would, therefore, change with temperature.

The method of the present invention for eliminating the error in the output current is shown in FIG. 5. FIG. 5 is similar to FIG. 1 and those parts having the same function are given the same numerical designation. The feedback resistance 27, which is not a part of FIG. 1, is connected between terminal 28 and terminal 12. As previously mentioned, this resistance reduces the gain of the circuit during the time when the diode-resistance feedback paths are open. A means for cancelling the error in the output current is provided by connecting resistance 31 ($R_{31}$) and a switch 40 in series between terminal 28 and the output terminal 13. The switch 40 is made to close when the voltage at terminal 28 is greater than zero and open when it is less than zero. In this circuit $R_{10} = R_{21} = R_{26}$ and $R_{22} = R_{23}$. Also, $R_{22} = 2R_{10}$ and $R_{27} = 2R_{31}$. This arrangement provides a method for precision rectification without loss of bandwidth and with compensation for the error in the output current produced by resistance 27. The correction can be illustrated by assuming that the current through resistance 21 for an input, $-E_{in}$, is I and the current diverted through feedback resistance 27 is $\Delta I$. Since the currents entering and leaving the summing junction at terminal 12 must be equal, the current through resistance 22 is $I-\Delta I$. Therefore, the current gain of two for the circuit, which is determined by resistance 26 and resistance 22, causes the current to the output through resistance 26 to be $2(I-\Delta I)$. The error current, $2\Delta I$, is then restored to the output by supplying current through a resistor ($R_{31}$) with half the value of the feedback resistance 27.

Figure 6:
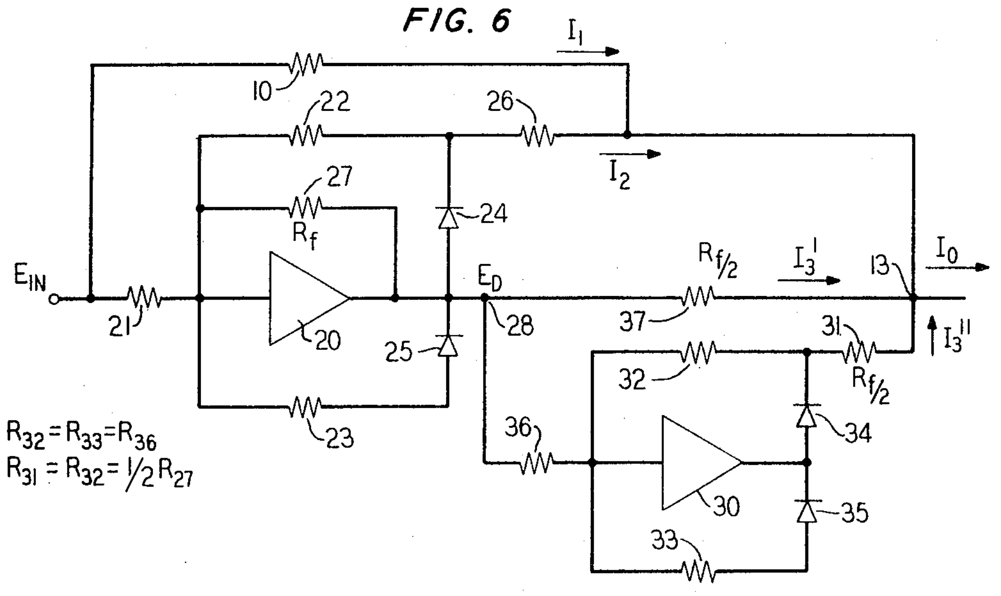
FIG. 6 is an illustrative embodiment of the invention using a prior art half wave rectifier to replace the switch and resistor of FIG. 5.

The switch 40 and resistance 31 may be implemented through the use of another rectifier. FIG. 6 shows such an arrangement.

FIG. 6 is similar to FIG. 1 and FIG. 5, and those elements which have the same function are given the same designation. In implementing the switch and resistor combination of FIG. 5, resistance 37 ($R_{37}$) is connected between terminal 28 and the circuit output terminal 13. Also, resistance 31 is connected in series with a unity gain half wave rectifier between terminals 28 and 13. The unity gain half wave rectifier comprises resistance 36 ($R_{36}$) connected between terminal 28 and the input of operational amplifier 30. The output of operational amplifier 30 is connected to the anode of diode 34 and the cathode of diode 35. The cathode of diode 34 is connected through resistance 32 ($R_{32}$) to the input of operational amplifier 30 and through resistance 31 ($R_{31}$) to the circuit output terminal 13. The anode of diode 35 is connected through resistance 33 ($R_{33}$) to the input of operational amplifier 30. In this arrangement $R_{32} = R_{33} = R_{36}$ and $R_{31} = R_{37} = 1/2R_{27}$.

Figure 7A:
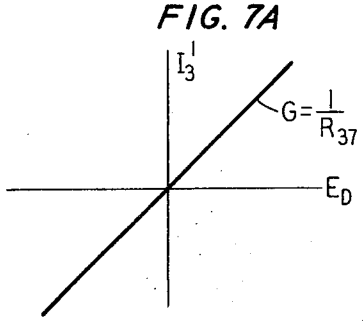
FIGS. 7A, 7B and 7C are a set of curves showing the operation of the circuit of FIG. 6.
Figure 7B:
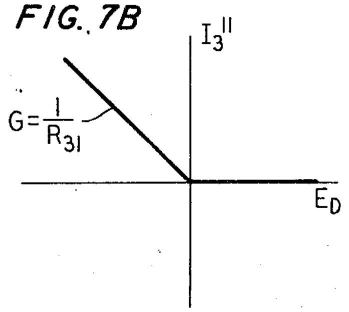
Figure 7C:
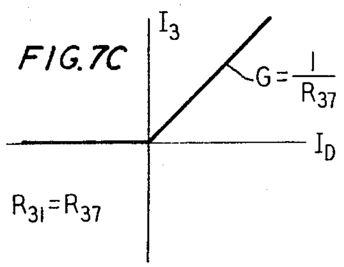

FIG. 7 shows how the switch and resistor of FIG. 5 are implemented with the unity gain half wave rectifier of FIG. 6. The current $I_3'$ through resistance 37 is shown in FIG. 7A. The current $I_3''$ through resistance 31 is shown in FIG. 7B. FIG. 7B shows that when the voltage at terminal 28 is positive, diode 34 opens and there is no current $I_3''$. However, when the voltage at terminal 28 is negative, the current $I_3'$ is related to it by resistance 31. When the currents $I_3'$ and $I_3''$ are combined, the current $I_3$ of FIG. 7C is produced. This is a situation which is identical to having switch 40 of FIG. 5 open when the voltage at terminal 28 is less than zero and closed when it is greater than zero. The unity gain half wave rectifier of FIG. 6 will suffer from the transient response problem mentioned previously. However, this will cause an error only in the correction current and not in the principal rectifier signal. Therefore, its effect can be ignored.

While the invention has been particularly shown and described with reference to preferred embodiments thereof, it will be understood by those skilled in the art that various changes in form and details may be made therein without departing from the spirit and scope of the invention.

We claim:

1. A rectifier circuit having an output which is connected to a summing junction and an input comprising:
- a first operational amplifier having an input and an output,
- a first input resistance connected between the circuit input and the input of said first amplifier,
- a first feedback diode having its anode connected to the output of said first amplifier,
- a first feedback resistance connected between the cathode of said first feedback diode and the input of said first amplifier,
- a second feedback diode having its cathode connected to the output of said first amplifier,
- a second feedback resistance connected between the anode of said second feedback diode and the input of said first amplifier,
- a first output resistance connected between the cathode of said first diode and the circuit output,
- a second output resistance connected between the input and output of the circuit,
- a third feedback resistance connected between the input and output of said first amplifier, and
- a variable resistance means connected between the output of said first amplifier and the output of the circuit, said variable resistance means providing a relatively infinite resistance when the voltage at the circuit input is positive and a finite resistance when the voltage is negative.

2. A circuit as claimed in claim 1, wherein said variable resistance means comprises:
- a second operational amplifier having an input and an output,
- a second input resistance connected between the output of said first amplifier and the input of said second amplifier,
- a third feedback diode having its anode connected to the output of said second amplifier,
- a fourth feedback resistance connected between the cathode of said third feedback diode and the input of said second amplifier,
- a fourth feedback diode having its cathode connected to the output of said second amplifier,
- a fifth feedback resistance connected between the anode of said fourth feedback diode and the input of said second amplifier,
- a third output resistance connected between the cathode of said third feedback diode and the circuit output,
- and a fourth output resistance connected between the output of said first amplifier and the circuit output.

3. A circuit as claimed in claim 2 wherein said third feedback resistance is substantially larger in value than said first feedback resistance.

4. A circuit as claimed in claim 2 wherein said first input resistance, said first output resistance, and said second output resistance are equal in value.

5. A circuit as claimed in claim 4 wherein said first feedback resistance and said second feedback resistance are equal in value and equal to twice the value of said first input resistance.

6. A circuit as claimed in claim 2 wherein said second input resistance, said fourth feedback resistance, and said fifth feedback resistance are equal in value.

7. A circuit as claimed in claim 2 wherein said third output resistance and said fourth output resistance are equal in value and equal to one-half the value of said third feedback resistance.

* * * * *

UNITED STATES PATENT OFFICE
CERTIFICATE OF CORRECTION

Patent No. 3,660,768 Dated May 2, 1972

Inventor(s) Carl Leslie Dammann and Frederick Alan Saal

It is certified that error appears in the above-identified patent and that said Letters Patent are hereby corrected as shown below:

In the drawings,

Sheet 1, FIG. 2A, delete "$G_{12} = 1/R_{11}$" and substitute therefor --$G = 1/R_{10}$--.

FIG. 2B, delete "$G_{12} = (R_{13}/R_{12})R_{14} = -2R_{11}$" and substitute therefor --$G = -R_{22}/(R_{21}R_{26}) = -2/R_{10}$--.

Figure 2C:
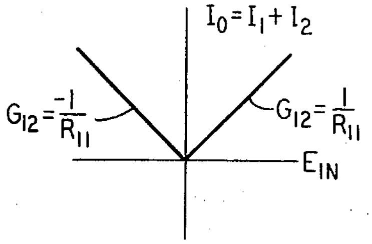
Figure 2D:
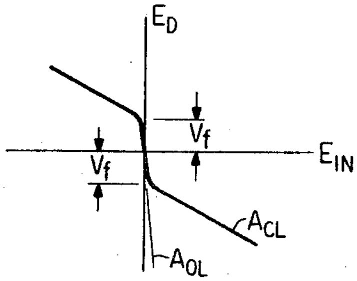

FIG. 2C, delete "$G_{12} = -1/R_{11}$" and "$G_{12} = 1/R_{11}$" and substitute therefor --$G = -1/R_{10}$-- and --$G = 1/R_{10}$--.

Sheet 2, FIG. 4A, delete "$G = 1/R_{11}$" and "$G = R_f/R_{12}$" and substitute therefor --$G = -1/R_{10}$-- and --$G = -R_{27}/R_{21}$--.

FIG. 4B, delete "$-2/R_{11}$" and substitute therefor --$G = -2/R_{10}$--.

FIG. 4C, delete "$-1/R_{11}$" and "$1/R_{11}$" and substitute therefor --$G = -1/R_{10}$-- and --$G = 1/R_{10}$--.

Sheet 3, FIG. 7B, delete "$1/R_{31}$" and substitute therefor -- $-1/R_{31}$--.

FIG. 7C, delete "$I_d$" as an axis designation and substitute therefor --$E_d$--.

Signed and sealed this 1st day of May 1973.

(SEAL)
Attest:

EDWARD M. FLETCHER, JR.
Attesting Officer

ROBERT GOTTSCHALK
Commissioner of Patents